United States Patent

Fujii et al.

[11] Patent Number: 6,131,942
[45] Date of Patent: Oct. 17, 2000

[54] AIRBAG DEVICE

[75] Inventors: Hiroaki Fujii; Ichiro Amamori, both of Shiga, Japan

[73] Assignee: Takata Corporation, Tokyo, Japan

[21] Appl. No.: 09/315,029

[22] Filed: May 20, 1999

[30] Foreign Application Priority Data

May 29, 1998 [JP] Japan .................................. 10-164362

[51] Int. Cl.[7] ................................................ B60R 21/16
[52] U.S. Cl. ...................................... 280/728.2; 280/739
[58] Field of Search ................................ 280/739, 728.2

[56] References Cited

U.S. PATENT DOCUMENTS

| | | | |
|---|---|---|---|
| 4,877,264 | 10/1989 | Cuevas | 280/739 |
| 5,234,229 | 8/1993 | Gordon | 280/736 |
| 5,320,379 | 6/1994 | Burnard et al. | 280/739 |
| 5,501,488 | 3/1996 | Saderholm et al. | 280/739 |
| 5,603,526 | 2/1997 | Buchanan | 280/739 |
| 5,669,628 | 9/1997 | Kaufmann et al. | 280/739 |
| 5,743,558 | 4/1998 | Seymour | 280/739 |

FOREIGN PATENT DOCUMENTS

| | | |
|---|---|---|
| 0 405 710 | 1/1991 | European Pat. Off. . |
| 0 638 466 | 6/1994 | European Pat. Off. . |

*Primary Examiner*—Kenneth R. Rice
*Attorney, Agent, or Firm*—Kanesaka & Takeuchi

[57] ABSTRACT

An airbag device is formed of an airbag having a gas inlet, an inflator for providing a gas into the airbag through the gas inlet, and a retainer for fixing the airbag. The airbag is provided with at least one gas outlet formed around the gas inlet for discharging the gas therethrough. Therefore, the gas can escape outside of the airbag so as to prevent the inner pressure of the airbag from exceeding a predetermined value. The airbag can deploy smoothly and prevent undesired load to an obstacle.

6 Claims, 4 Drawing Sheets

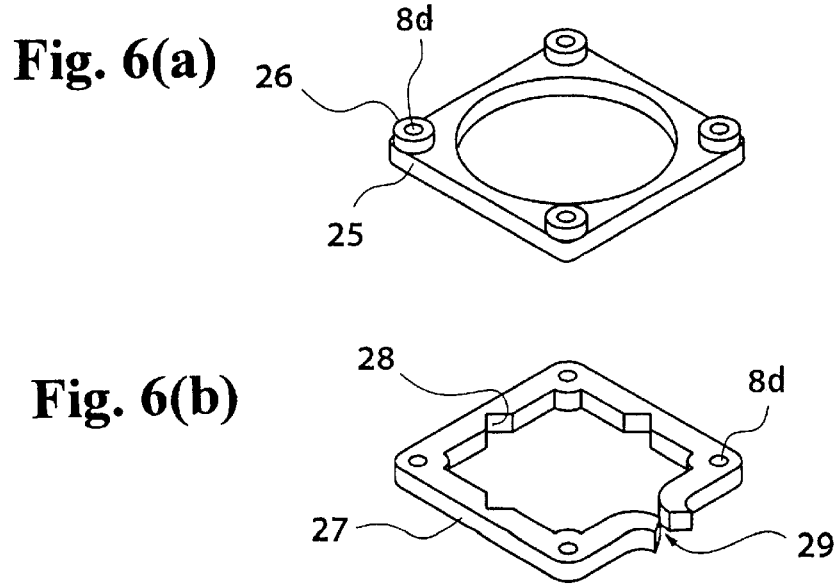
Fig. 6(a)
Fig. 6(b)
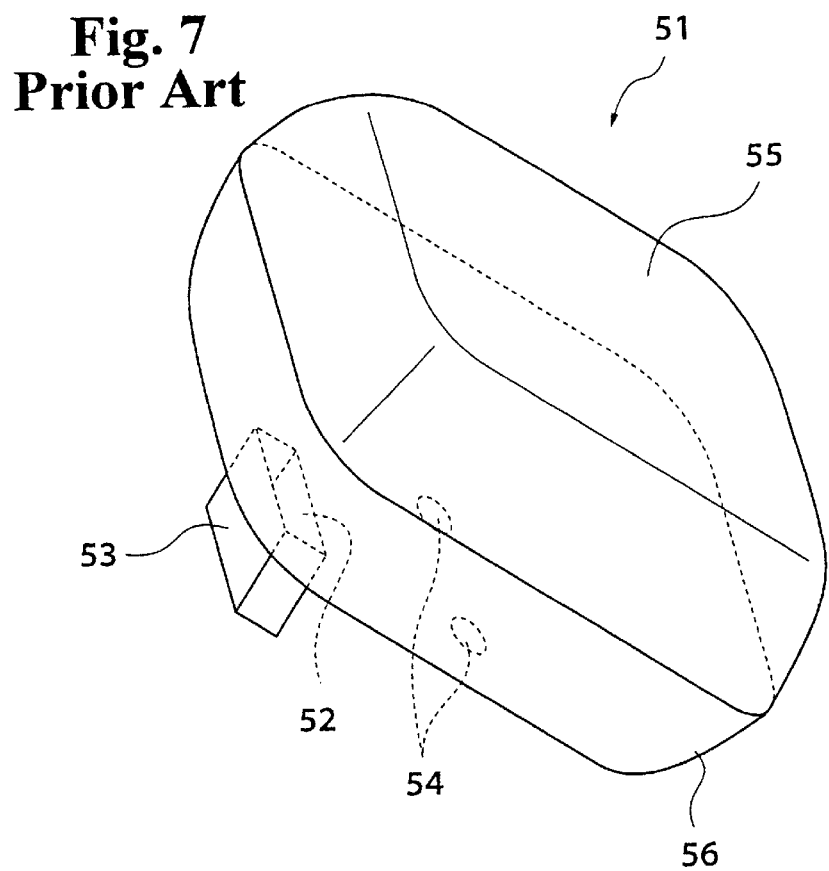
Fig. 7
Prior Art

AIRBAG DEVICE

BACKGROUND OF THE INVENTION AND RELATED ART STATEMENT

The present invention relates to an airbag device in which an airbag is deployed to protect an occupant in the event of vehicle collision. More particularly, the present invention relates to an airbag device which can accomplish suitable deployment of an airbag for securely and sufficiently restraining an occupant and which is improved in the smooth deployment.

It is to be noted that the present invention can be applied to any airbag devices for a driver's seat, a front passenger's seat, a rear passenger's seat, a side airbag device and so on.

Conventionally, in order to protect an occupant in the event of vehicle collision, airbag devices for a driver's seat and a front passenger's seat have been employed.

FIG. 7 is a view showing an airbag, in its fully deployed state, of a typical airbag device which has been conventionally used. The airbag device includes an airbag 51 comprising a front panel 55 and a rear panel 56, and an inflator 53 which spouts a gas into the airbag 51.

The rear panel 56 of the airbag 51 is provided with a gas inlet 52 through which a gas is spouted from the inflator 53, and vent holes 54 for discharging the gas from the inside of the airbag 51. The inflator 53 is attached to a portion around the gas inlet 52 of the rear panel 56 through a retainer (not shown).

In the conventional airbag device structured as mentioned above, the gas is spouted from the inflator 53 in the event of vehicle collision. The gas enters into the airbag 51 through the gas inlet 52 so as to deploy the airbag 51. On the other hand, a part of the gas is gradually discharged through the vent holes 54. When the head or body of an occupant collides with the airbag 51, the gas within the airbag escapes outside through the vent holes 54, so that the airbag shrinks, thereby absorbing kinetic energy of the occupant. Furthermore, after a short period of time, the airbag shrinks so as to recover a visual field for the occupant.

However, the conventional airbag device has the following problems. Namely, there is a possibility that the airbag starts to deploy even when there is an obstacle to disturb the enough deployment of the airbag. In this case, as the airbag is deployed in a state where a portion around the vent holes of the airbag is not completely deployed, an undesired load may be applied because the vent holes for gas leak are blocked.

The present invention has been made in order to solve the above problem, and an object of the present invention is to provide an airbag device which is improved in the smooth deployment.

Another object of the invention is to provide an airbag device as stated above, wherein an undesired load is not formed by the airbag.

Further objects and advantages of the invention will be apparent from the following description of the invention.

SUMMARY OF THE INVENTION

In order to solve the above-described problems, according to a first aspect of the present invention, an airbag device comprises an airbag having a gas inlet, an inflator for providing a gas into the airbag through the gas inlet, and a retainer for fixing the airbag, wherein the airbag is provided with gas outlets formed around the gas inlet for discharging the gas.

The gas outlets are formed around the gas inlet to allow the gas to escape through the gas outlets, thereby preventing the inner pressure of the airbag from unnecessarily becoming high.

In this aspect, the retainer is fixed to the airbag around the gas outlets of the airbag, and the gas outlets are formed to penetrate through the airbag and the retainer.

As structured above, the gas outlets can be disposed near the periphery of the gas inlet. An additional advantage of this is that the gas can be smoothly discharged.

According to a second aspect of the present invention, the airbag is provided with the gas outlets around the gas inlet, wherein the gas outlets are torn to allow the gas to be discharged when the pressure in the airbag reaches a predetermined value.

Since the gas outlets are torn to allow the gas to be discharged when the pressure in the airbag reaches a predetermined value, the deployment pressure of the airbag can be controlled under a predetermined value.

In this aspect, the gas outlets of the airbag may be composed of cut portions and a seam of a predetermined strength. Also, a portion around the gas inlet may be composed of plural base fabrics, and the gas outlets or the cut portions may be formed in some of the base fabrics.

The deployment pressure of the airbag can be controlled by the number or the strength of the base fabrics in which the gas outlets or the cut portions are formed.

In the airbag device according to a third aspect of the present invention, a spacer may be provided with gas outlets which are broken to allow the gas to be discharged when the pressure in the airbag reaches a predetermined value.

As structured above, the deployment pressure of the airbag can be controlled by the breaking strength of the spacer. An additional advantage by forming the gas outlets in the spacer, not in the airbag, is that the requirement of providing the gas outlets in the airbag can be eliminated.

In the airbag device according to a fourth aspect of the present invention, a space is formed between the inflator and the gas inlet of the airbag and a passage is formed between the retainer and the airbag, so that the gas is discharged through the space and the passage.

Since the space is formed between the inflator and the airbag and the passage is formed between the retainer and the airbag, the gas escapes outside the airbag through the space and the passage so as to prevent the inner pressure of the airbag from exceeding the predetermined value. An additional advantage of this structure is that the requirement of providing the gas outlets in the airbag can be eliminated.

BRIEF DESCRIPTION OF THE DRAWINGS

FIGS. 6(a) and 6(b) are perspective views showing other embodiments of the spacers used in the airbag device of the present is invention; and FIG. 7 is a perspective view showing a conventional airbag device.

DETAILED DESCRIPTION OF PREFERRED EMBODIMENTS

Hereinafter, the present invention will be described with reference to attached drawings.

Figure 1:
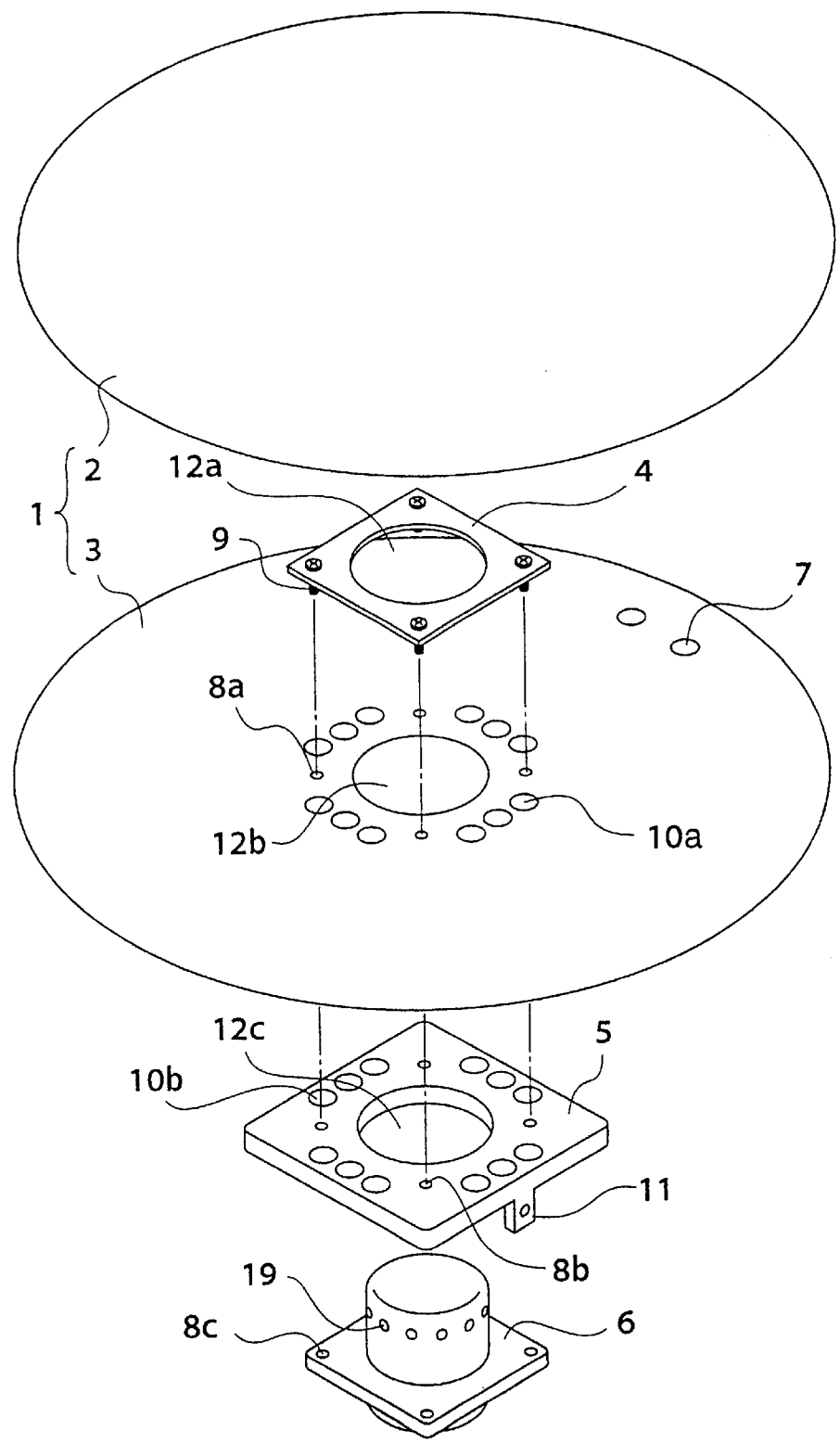
FIG. 1 is an exploded perspective view showing an airbag device according to the present invention.

FIG. 1 is an exploded perspective view showing an airbag device according to one embodiment of the present invention. The airbag device includes an airbag 1 comprising a front panel 2 and a rear panel 3, a ring 4, a retainer 5 and an inflator 6. The airbag 1 is made by sewing the front panel 2 and the rear panel 3 together at the peripheries thereof. The front panel 2 and the rear panel 3 are made of plural pieces of textile fabrics (basic cloths), respectively.

The ring 4 is situated between the front panel 2 and the rear panel 3, i.e. inside the airbag 1, and functions for fixing the rear panel 3 of the airbag 1 to the retainer 5. The rear panel 3 is provided with vent holes 7 formed near the periphery thereof, holes 8a, through which screws 9 of the ring 4 are inserted, gas outlets 10a, and a gas inlet 12b for deployment. The retainer 5 is provided with holes 8b at portions corresponding to the holes 8a of the rear panel 3, through which the screws 9 of the ring 4 are inserted, and gas outlets 10b for discharging a gas formed at portions corresponding to the gas outlets 10a of the rear panel 3. The retainer 5 also has holes 11 on both side thereof for connecting the airbag device to a module cover (not shown). The inflator 6 is provided with holes 8c at portions corresponding to the holes 8a of the rear panel 3 and the holes 8b of the retainer 5, through which the screws 9 of the ring 4 are inserted, and also gas outlets 19, through which a gas is spouted for deploying the airbag.

Further, the ring 4 and the retainer 5 are provided with inflator insertion openings 12a and 12c at portions corresponding to the gas inlet 12b of the rear panel 3, which are formed in substantially the center thereof, respectively. A portion including the gas outlets 19 of the inflator 6 enters inside the airbag 1 through the inflator insertion openings 12a and 12c.

The holes 8a and 8b are situated around the gas inlet 12b and the inflator insertion opening 12c. The gas outlets 10a are situated around the gas inlet 12b and the holes 8a, and the gas outlets 10b are situated around the inflator insertion opening 12c and the holes 8b.

As mentioned above, the peripheries of the front panel 2 and the rear panel 3 are sewed up, thus forming the airbag 1. The screws 9 of the ring 4 are inserted from the inside of the airbag 1 through the holes 8a of the rear panel 3, the holes 8b of the retainer 5, and the holes 8c of the inflator 6, and nuts (not shown) are then screwed onto the ends of the screws 9 outside of the device. In this manner, the airbag device of this embodiment is constructed. The airbag device is fixed to the module cover (not shown) by screws or bolts inserted into the holes 11 provided on both sides of the retainer 5.

Figure 2:
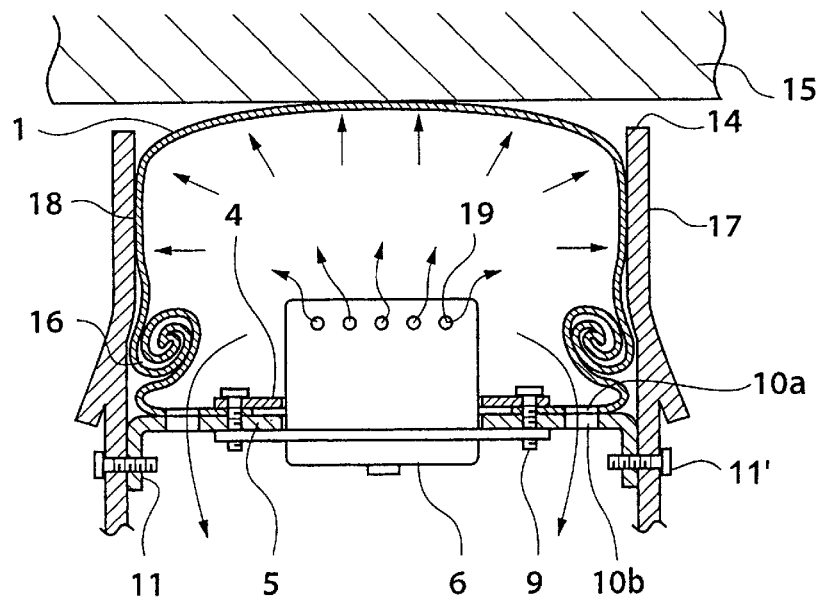
FIG. 2 is a sectional view of the airbag device of the present invention shown in FIG. 1, illustrating a state in which the airbag is being deployed.

FIG. 2 is a sectional view of the airbag device of the present invention shown in FIG. 1 in the condition that the airbag 1 is being deployed. The airbag device is accommodated in the module cover 17 and is fixed to the module cover 17 by screws 11' inserted into the holes 11.

To deploy the airbag 1 of the airbag device in the event of vehicle collision, a gas is spouted from the gas outlets 19 of the inflator 6. As the gas is spouted from the gas outlets 19 of the inflator 6, the airbag 1 starts to inflate with a gas pressure. The airbag 1 during the inflation presses the rear surface of the module cover 17, so that a tear line 14 formed in the occupant-side surface of the module cover 17 is torn by the airbag 1. After that, the airbag 1 is further largely deployed.

When an obstacle 15 is located too close to the airbag device as shown in FIG. 2, the airbag 1 can not be fully deployed and comes to contact with the obstacle 15 to apply pressure thereto. If the vent holes 7 (FIG. 1) are, at this point, situated at a portion 16 not deployed yet, i.e. still rolled and/or folded, or a contact portion 18 with the module cover 17, the inner pressure of the airbag 1 can not be controlled because the gas is not discharge through the vent holes 7 (FIG. 1), thereby increasing the inner pressure of the airbag 1. However, in the airbag device of this embodiment, the gas escapes outside through the gas outlets 10a, 10b of the rear panel 3 and the retainer 5, positioned around the periphery of the inflator 6, thereby preventing the inner pressure of the airbag 1 from exceeding a predetermined value. Therefore, according to the airbag 1, the application of undesired pressure onto the obstacle 15 can be prevented.

The rear panel 3 is made of plural pieces of reinforcing and heat-resisting textile fabrics (base fabrics or cloths). The gas outlets 10a may be formed in some of the plural base fabrics constituting the rear panel 3. Thus, as the inner pressure in the airbag 1 reaches the predetermined value, the base fabrics without By the outlets for blocking the gas outlets 10a are broken to allow the gas to escape outside.

The gas outlets 10a, 10b may be composed of one hole or plural holes, for example, twelve holes, respectively as shown in FIG. 1. In this embodiment, the diameter of the gas outlets 10a, 10b is about 12 mm. The volume of the airbag 1 of this embodiment is 60 liters. The gas outlets 10a and 10b may be positioned to surround the gas inlet 12b and the inflator insertion opening 12c.

Figure 3:
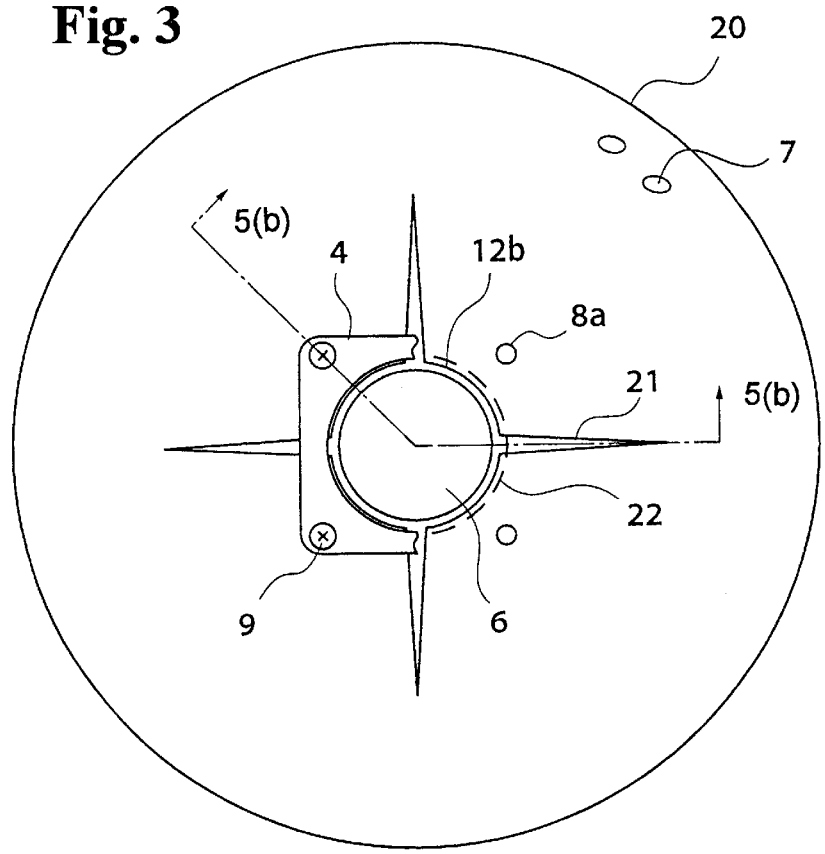
FIG. 3 is a partial schematic view of the airbag device according to another embodiment of the present invention, which is taken in a direction from the inside of the airbag toward a rear panel.

FIG. 3 is a partial schematic view of an airbag of an airbag device according to another embodiment of the present invention, which is taken in a direction from the inside of the airbag toward the rear panel. In the right-hand side of FIG. 3, the ring 4 is omitted in order to clarify the characteristics of a rear panel 20. As shown in FIG. 3, cut portions 21 are formed by cutting the rear panel 20 for a predetermined length along lines, each line extending in a radial direction through the center between the adjacent holes 8a. The cut portions 21 are sewn by a seam 22 around the gas inlet 12b.

According to the airbag device having the rear panel 20 shown in FIG. 3, the gas is spouted from the inflator 6 in the event of a vehicle collision. As the gas is spouted from the inflator 6, the airbag is deployed with the pressure of the gas. At this point, as shown in FIG. 2, when the airbag can not be fully deployed and the inner pressure of the airbag 1 can not be controlled due to blocking of the vent holes 7, the inner pressure of the airbag 1 is increased. As the inner pressure of the airbag 1 reaches a predetermined value, the seam 22 of the rear panel 20 is broken or cut so as to form gas outlets. The gas in the airbag 1 escapes outside from the gas outlets of the cut portions 21 so as to prevent the inner pressure of the airbag 1 from exceeding the predetermined value. Therefore, in the airbag device shown in FIG. 3, the application of undesired pressure onto the obstacle 15 can be prevented just like the airbag device shown in FIG. 1.

A retainer used in the airbag device shown in FIG. 3 need not have the gas outlets 10b as shown in FIG. 1. The number of the cut portions 21 formed in the rear panel 20 may be arbitrary, instead of four as shown in FIG. 3. The cut portions 21 may be formed in some of the plural base fabrics constituting the rear panel 3, so that, as the inner pressure in the airbag 1 reaches the predetermined value, the residual base fabrics are broken to allow the gas to escape outside. The seam 22 may not be provided or the seam 22 may be composed of one or plural lines. That is, the seam 22 is determined according to the pressure for breaking the cut portions 21.

To facilitate the breakage of the cut portions 21, the ring may be deformed or a spacer may be provided between the rear panel 20 and the retainer. As the breakage of the cut portions 21 is facilitated by deforming the ring or by the spacer, the breakage of the cut portions 21 can be easily controlled by the seam 22, thereby facilitating the control of the inner pressure of the airbag.

Figure 4A:
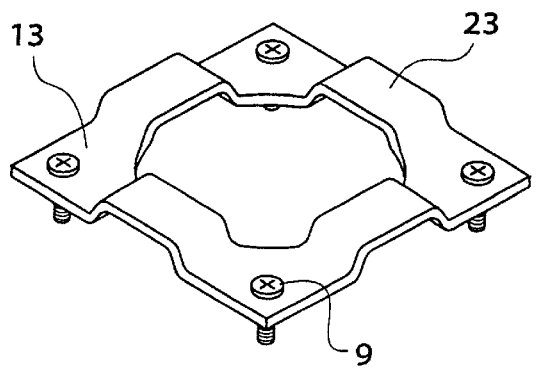
FIG. 4(a) is a perspective view of a ring used in the airbag device shown in FIG. 3 of the invention.
Figure 4B:
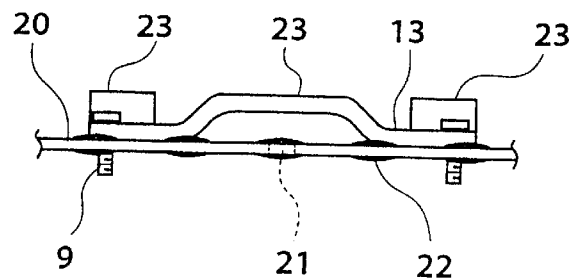
FIG. 4(b) is a side view of the ring used in the airbag device.

FIGS. 4(a) and 4(b) show an embodiment of the ring used in the airbag device shown in FIG. 3. FIG. 4(a) is a perspective view of the ring. The ring 13 has expanded or stepped portions 23, which are formed between the holes for screws 9 by pressing. FIG. 4(b) is a front view of the ring 13 in the state where the ring 13 is attached to the rear panel 20 for attaching to the retainer, and they are laid horizontally. As shown in FIG. 4(b), because of the presence of the stepped portions 23 of the ring 13, spaces are formed between the ring 13 and the cut portions 21 of the rear panel 20. Therefore, the cut portions 21 are prevented from being clamped between the ring 13 and the retainer so as to allow the easier breakage of the cut portions 21.

Figure 5A:
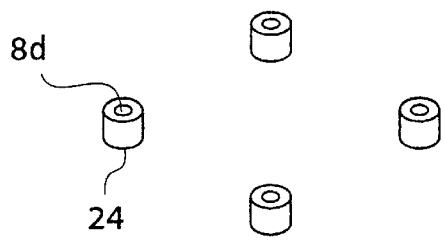
FIG. 5(a) is a perspective view of spacers used in the airbag device of the present invention.
Figure 5B:
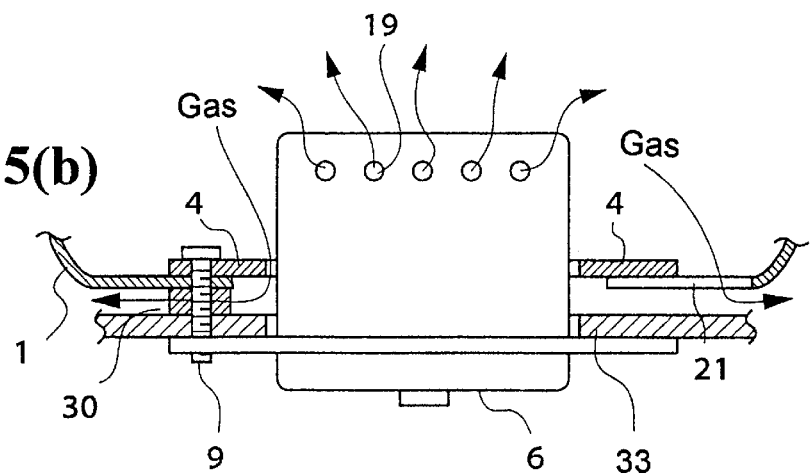
FIG. 5(b) is a sectional view taken along line 5(b)—5(b) in FIG. 3, in which the spacers shown in FIG. 5(a) are used.

FIG. 5(a) shows an embodiment of spacers used for the airbag device of the present invention, and FIG. 5(b) is a sectional view of the airbag device taken along line 5(b)—5(b) in FIG. 3 having spacers 24 of FIG. 5(a). The spacer 24 has a predetermined height, so that passages for allowing a gas to escape are formed according to this height. Each spacer 24 has a hole 8d corresponding to each screw 9 of the ring 4.

As shown in FIG. 5(b), because of the presence of the spacers 24, spaces are formed between the ring 4 and a retainer 33. Therefore, the cut portions 21 are prevented from being clamped between the ring 4 and the retainer 33 so as to allow the easier breakage of the cut portions 21. The gas passes through a space between the ring 4 and the inflator 6 and the spaces (passages) 30 between the ring 4 and the retainer 33 so as to allow the gas to suitably escape, thereby accomplishing a smoother deployment of the airbag.

The retainer 5 of the airbag device shown in FIG. 1 can be exchanged with a retainer 33 without the gas outlets 10b and, in this case, the spacers 24 may be disposed between the ring 4 and the retainer 33 as shown in FIG. 5(b). In this structure, the gas escaping from the gas outlets 10a of the rear panel 3 can escape through the passages 30 between the ring 4 and the retainer 33, thereby exhibiting the same effect.

FIGS. 6(a) and 6(b) show other embodiments of the spacer. A spacer 25 shown in FIG. 6(a) has holes 8d, through which the screws 9 of the ring 4 are inserted, and convexities 26 around the holes 8d. The spacer 25 are situated between the rear panel 20 and the retainer 33 in the same manner as the spacers 24 shown in FIGS. 5(a) and 5(b). Therefore, the rear panel 20 is strongly clamped between the ring 4 and the convexities 26 of the spacer 25 so as to form spaces (passages) between the adjacent convexities 26. When the spacer 25 is applied to the airbag device shown in FIG. 3, the cut portions 21 are prevented from being clamped between the ring 4 and the retainer 33 so as to allow the easier breakage of the cut portions 21. The gas passes through the space between the ring 4 and the inflator 6 and the spaces (passages) 30 between the convexities 26 so as to allow the gas to suitably escape, thereby accomplishing a smoother deployment of the airbag.

Also when the retainer 5 of the airbag device shown in FIG. 1 is exchanged with the retainer 33 without the gas outlets 10b and the spacer 25 is disposed between the ring 4 and the retainer 33, the same effect can be obtained.

A spacer 27 shown in FIG. 6(b) has holes 8d, through which the screws 9 of the ring 4 are inserted, and notches 28 formed at portions between the holes 8d. The spacer 27 is disposed between the rear panel 20 and the retainer 33 in the same manner as the spacer 24 shown in FIG. 5(b). When the spacer 27 is applied to the airbag device shown in FIG. 3, as the inner pressure of the airbag 1 reaches a predetermined value, the notches 28 of the spacer 27 are broken by the pressure of the gas within the spacer 27. Broken portions 29 thus formed become passages for allowing the gas to escape. Therefore, the inner pressure of the airbag 1 never exceeds the predetermined value, so that application of undesired pressure onto the obstacle can be prevented in the same manner as mentioned above.

The whole spacer 27 may be made of plastics or only the portions including the notches 28 may be made of plastics. This spacer 27 can be applied to the airbag having the gas outlets 10a and the cut portions 21 as shown in FIG. 1 and FIG. 3.

The description has been made as regard to the spacers used for the airbag device of the present invention. By using the spacers 24, 25, 27, the gas can pass through the space between the ring 4 and the inflator 6 and the spaces (passages) formed by the spacers 24, 25, 27 so as to allow the gas to suitably escape, thereby eliminating the gas outlets 10a and the cut portions 21 shown in FIG. 1 and FIG. 3.

The embodiments of the airbag device of the present invention have been explained. In the airbag device of the present invention, the inner pressure of the airbag 1 can be controlled by the gas outlets 10a (FIG. 1), the cut portions 21 (FIG. 3), the passages 30 (FIG. 5), so that the vent holes 7 are not necessarily provided.

As apparent from the above description, the present invention can provide the airbag device in which the inner pressure of the airbag can be controlled by provision of the gas outlets, cut portions, and/or passages so as to provide smooth deployment of the airbag and thus to prevent the application of undesired load regardless of the existence of an obstacle.

While the invention has been explained with reference to the specific embodiments of the invention, the explanation is illustrative and the invention is limited only by the appended claims.

What is claimed is:

1. An airbag device comprising:

an airbag having a gas inlet and a seam around the gas inlet, an inflator for providing a gas into the airbag through the gas inlet, a retainer for fixing the airbag, and at least one gas outlet formed in the airbag around the gas inlet for discharging the gas supplied from the inflator into the airbag outwardly through a vicinity of the inflator, said at least one gas outlet being a cut portion extending from the gas inlet and connected by the seam around the gas inlet, said seam providing a predetermined strength so that when a pressure in the airbag reaches a predetermined value, the seam tears to allow the gas to be discharged outside the airbag.

2. An airbag device as claimed in claim 1, further comprising a ring situated inside the airbag around the gas inlet to hold the airbag between the ring and the retainer, said ring having a stepped portion above the cut portion to form a space therebetween to thereby allow the seam to be cut easily at the cut portion.

3. An airbag device as claimed in claim 1, further comprising a module cover for covering the airbag, said at least one gas outlet being situated at a portion corresponding to an inside of the module cover when the airbag is fully opened.

4. An airbag device, comprising:

an airbag having a gas inlet, an inflator for providing a gas into the airbag through the gas inlet, a retainer for fixing the airbag, and a spacer situated between the airbag and the retainer and completely surrounding the gas inlet, said spacer having at least one weakened portion, which is broken to allow the gas to be discharged when a pressure in the airbag reaches a predetermined value, to thereby provide at least one gas outlet around the gas inlet for discharging the gas supplied from the inflator into the airbag outwardly through a vicinity of the inflator.

5. An airbag device comprising:

an airbag having a gas inlet, an inflator for providing a gas into the airbag through the gas inlet, a retainer for fixing the airbag, a ring situated inside the airbag and connected to the retainer for holding the airbag around the gas inlet between the ring and the retainer, and at least one gas outlet formed in the airbag around the gas inlet for discharging the gas supplied from the inflator into the airbag outwardly through a vicinity of the inflator, said at least one gas outlet being a cut portion extending outwardly from the gas inlet beyond the ring disposed around the gas inlet.

6. An airbag device as claimed in claim 5, wherein said cut portion has an elongated triangular shape extending from the gas inlet to a portion away from the gas inlet so that a width of the cut portion at the gas inlet is gradually reduced to the point away from the gas inlet.

* * * * *